United States Patent
Rath et al.

(10) Patent No.: US 11,645,236 B2
(45) Date of Patent: May 9, 2023

(54) EXTENDING RETENTION LOCK PROTECTION FROM ON-PREMISES TO THE CLOUD

(71) Applicant: EMC IP Holding Company LLC, Hopkinton, MA (US)

(72) Inventors: Jagannathdas Rath, Bangalore (IN); Kalyan C. Gunda, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

(21) Appl. No.: 17/022,677

(22) Filed: Sep. 16, 2020

(65) Prior Publication Data

US 2022/0083514 A1  Mar. 17, 2022

(51) Int. Cl.
| | | |
|---|---|---|
| G06F 7/00 | (2006.01) | |
| G06F 17/00 | (2019.01) | |
| G06F 16/176 | (2019.01) | |
| G06F 16/17 | (2019.01) | |
| G06F 16/174 | (2019.01) | |
| G06F 11/14 | (2006.01) | |
| G06F 16/16 | (2019.01) | |

(52) U.S. Cl.
CPC ...... *G06F 16/1774* (2019.01); *G06F 11/1451* (2013.01); *G06F 11/1464* (2013.01); *G06F 11/1469* (2013.01); *G06F 16/164* (2019.01); *G06F 16/1734* (2019.01); *G06F 16/1748* (2019.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 10,650,146 | B1 * | 5/2020 | Gaurav | G06F 21/565 |
| 2006/0101081 | A1 * | 5/2006 | Lin | G06F 16/2343 |
| 2013/0262423 | A1 * | 10/2013 | Graefe | G06F 16/2343 |
| | | | | 707/703 |
| 2015/0358408 | A1 * | 12/2015 | Fukatani | G06F 11/1448 |
| | | | | 709/204 |

* cited by examiner

*Primary Examiner* — Tuan A Pham
(74) *Attorney, Agent, or Firm* — Staniford Tomita LLP

(57) ABSTRACT

Embodiments for retention locking a deduplicated file stored in cloud storage by defining object metadata for each object of the file, and comprising a lock count and a retention time based on an expiry date of the lock, with each object having segments, the object metadata further having a respective expiry date and lock count for each segment, where at least some segments are shared among two or more files. Also updating the lock count and retention time for all segments of the file being locked; and if the object is not already locked, locking the object using a retention lock defining a retention time and updating the object metadata with a new lock count and the retention time, otherwise incrementing the lock count and updating the retention time for the expiry date if expiry date of a previous lock is older than a current expiry date.

13 Claims, 13 Drawing Sheets

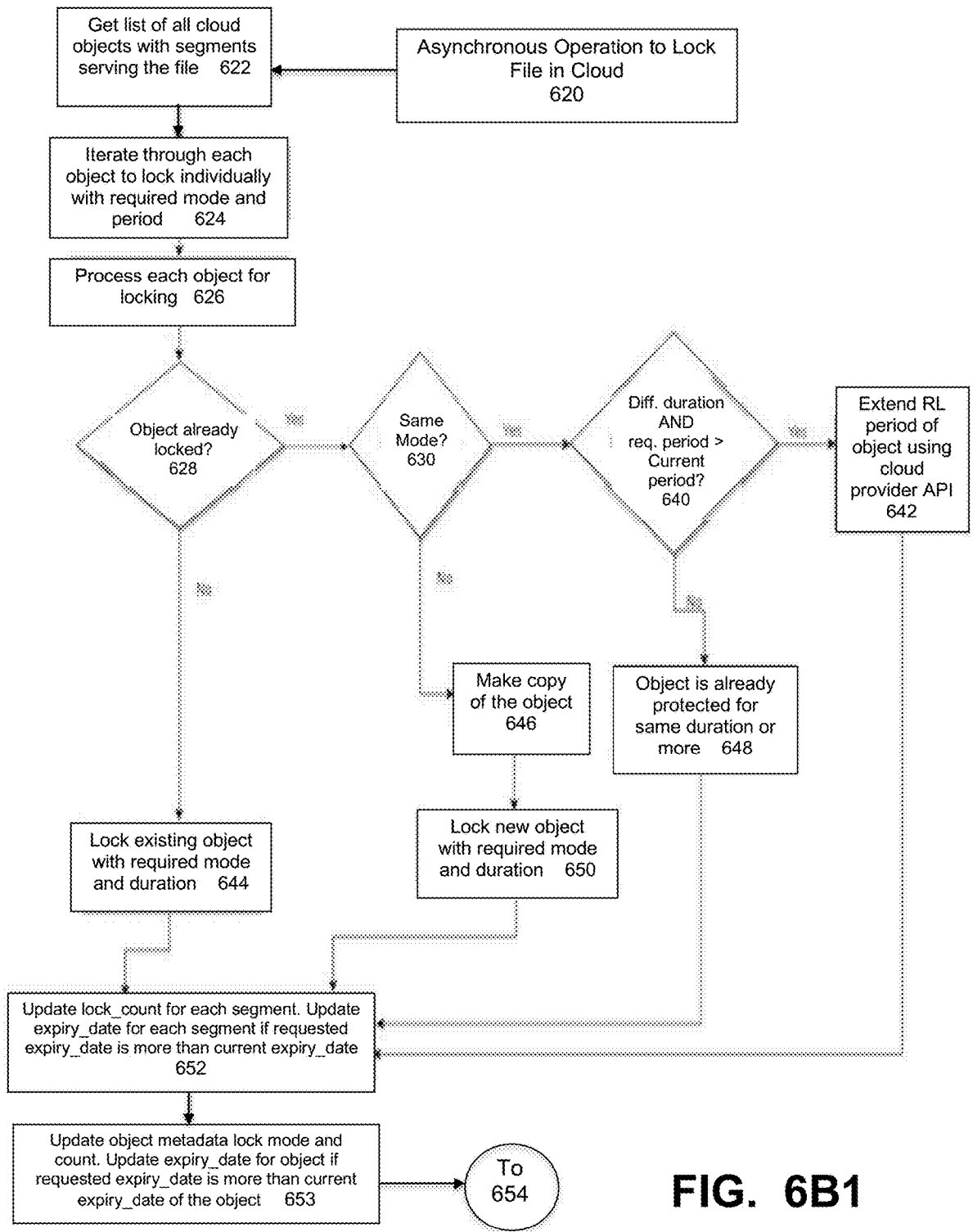
FIG. 6B1

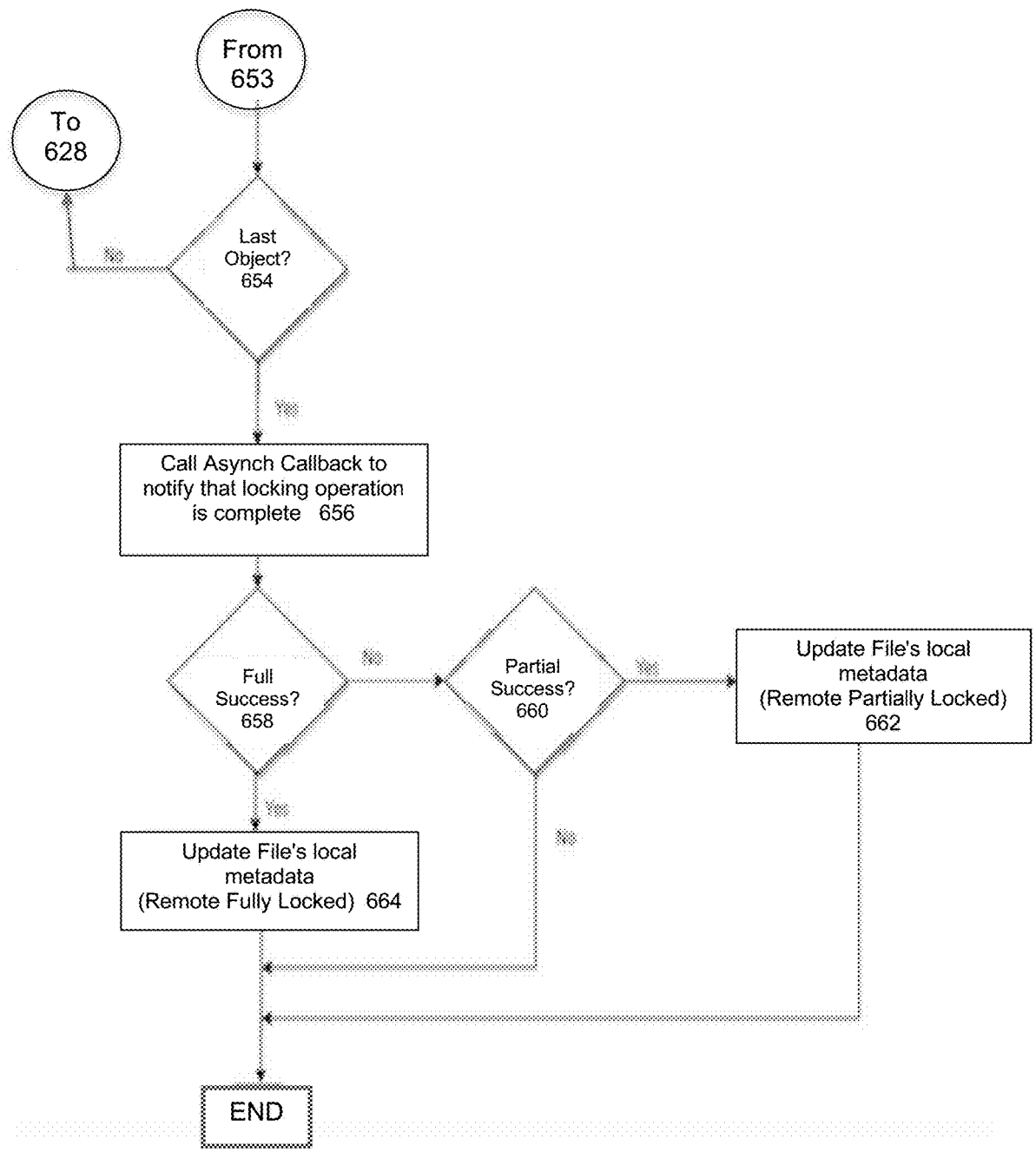
FIG. 6B2

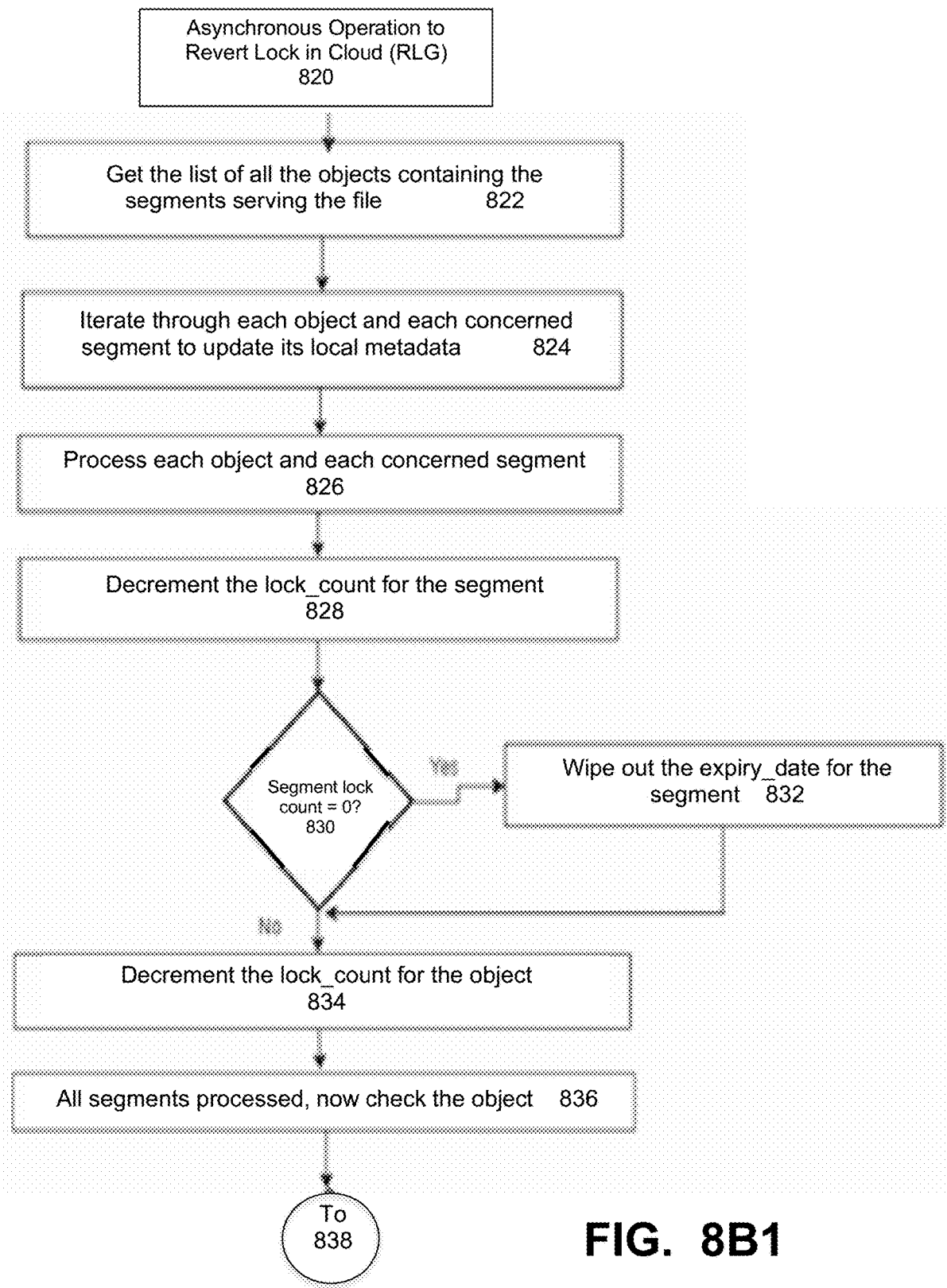
FIG. 8B1

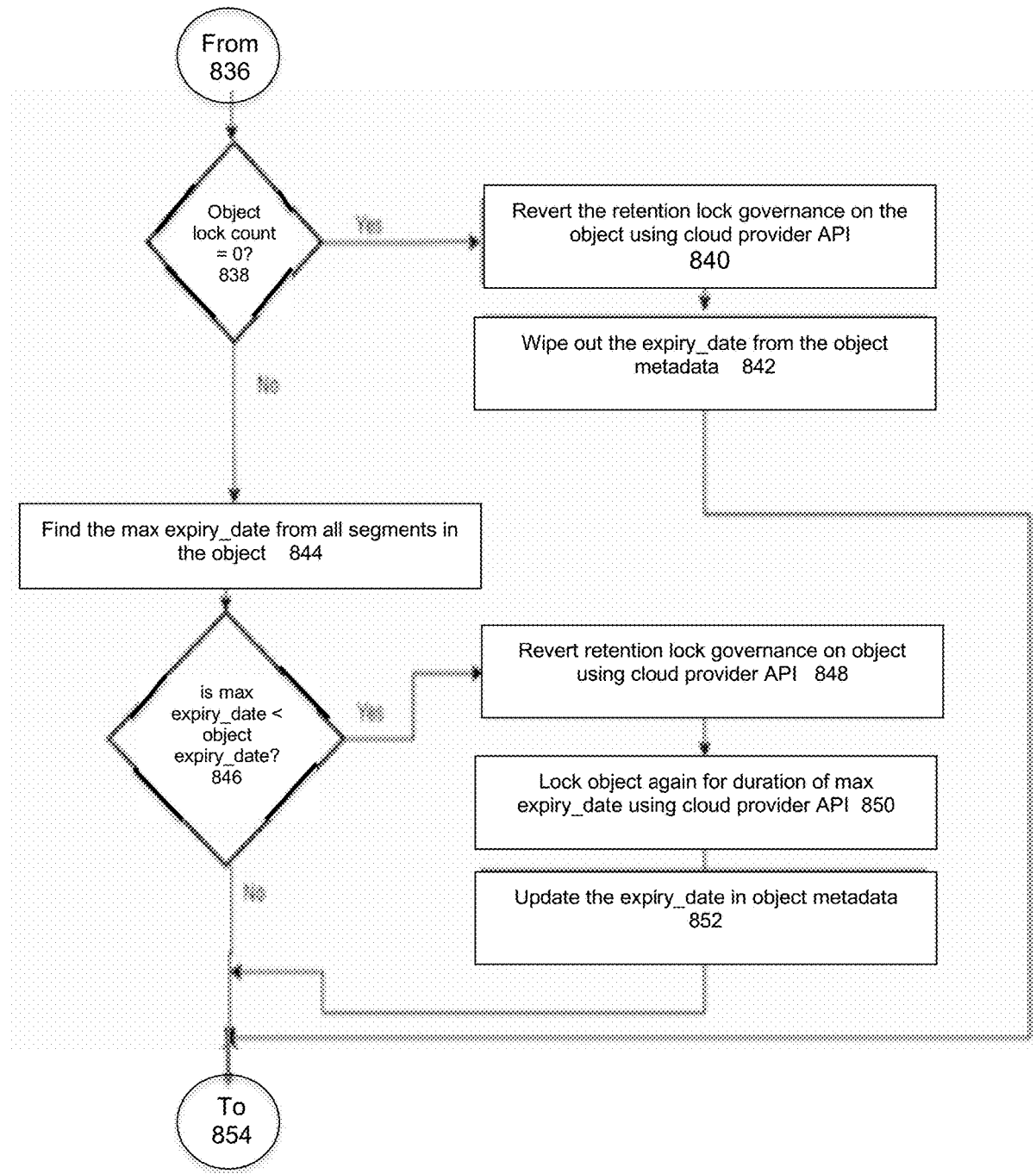
FIG. 8B2

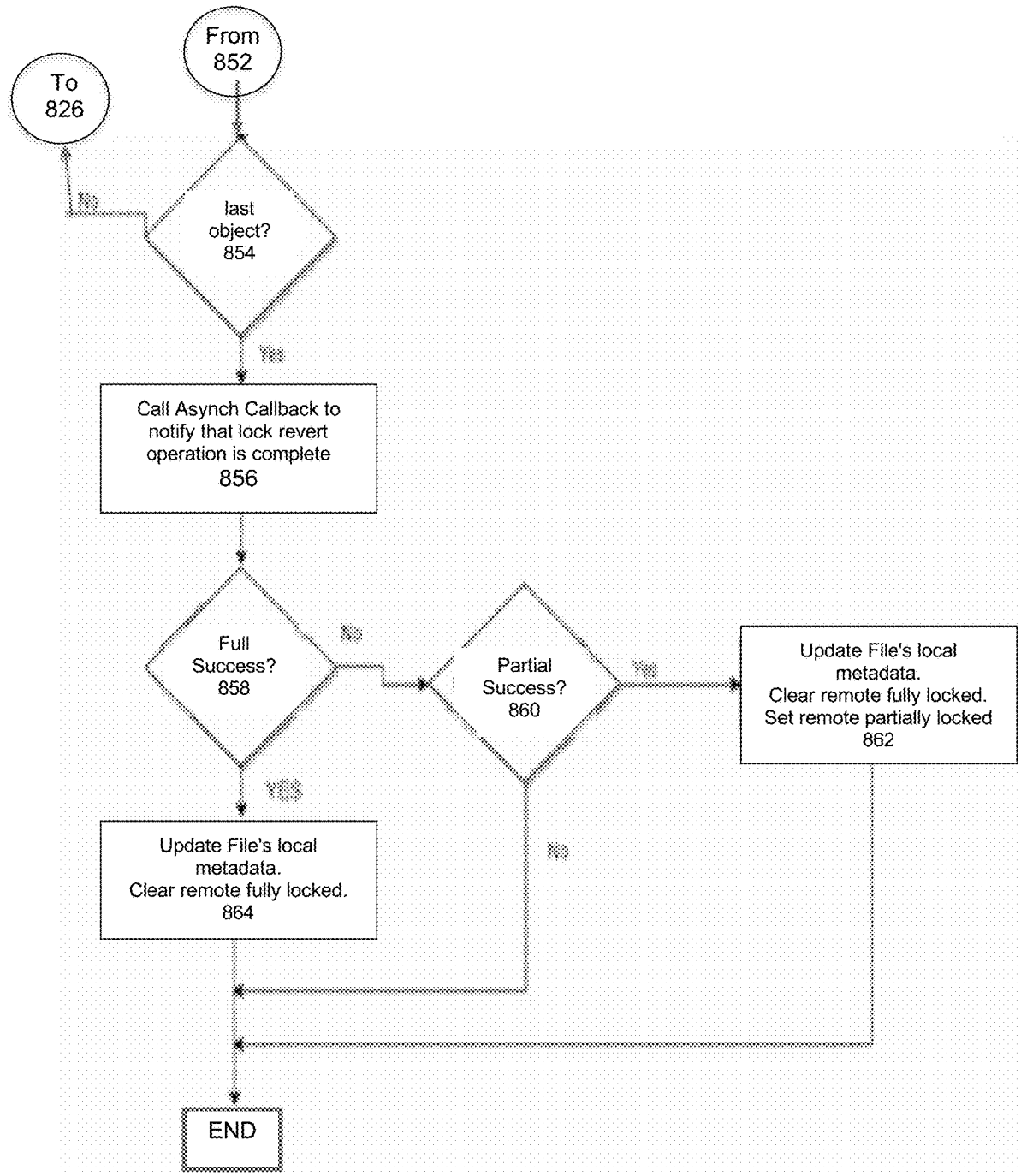
FIG. 8B3

EXTENDING RETENTION LOCK PROTECTION FROM ON-PREMISES TO THE CLOUD

TECHNICAL FIELD

This invention relates generally to data storage, and more particularly to extending retention lock protection from local storage to cloud-based storage.

BACKGROUND OF THE INVENTION

Cloud computing provides a shared pool of configurable computing resources (e.g., computer networks, servers, storage, applications and services) that can be rapidly provisioned and released with minimal management effort. It allows users with various capabilities to store and process their data in either a private cloud or public cloud network in order to make data access easier and more reliable. Large-scale cloud computing infrastructure and services are often provided by cloud providers that maintain data centers with vast amounts of shared storage devices. Cloud networks are widely used for large-scale data backup operations by enterprises that process large amounts of data on a regular basis, such as weekly or daily company-wide backups. Cloud storage ("cloud tier") is typically associated with long-term storage of data that is stored for archival purposes and infrequently accessed, as opposed to local on-premises storage that is associated with current data. The long term storage or archiving of data by large enterprises often invokes certain corporate governance or compliance standards that mandate that data for business records be securely retained for long periods of time. Thus, long-term cloud storage often requires the use of retention lock software to provide adequate file locking and secure data retention to meet such corporate governance and compliance requirements.

Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. This greatly reduces storage requirements, at the expense of some processing overhead necessitated by deduplication operations.

In a deduplication backup system, a file is split into segments and these segments are deduplicated across all files in the system. The segments are packed in regions and containers which are represented as objects in a cloud network. As a result, cloud container objects end up containing multiple segments, each serving one or more files. When a file is retention locked in a local on-premises system, the file is protected by filesystem from being deleted/modified while it is locked. As storage is local and access is controlled by local administrators with controls at various levels (e.g., data center, system, and file system levels), the data is still in control of local administrators. Cloud storage, however, presents a challenge in that the data is in external storage from a cloud provider where a cloud administrator has access to objects independent from the deduplication system administrator. The cloud administrator can thus delete objects unknowingly or otherwise, resulting in data loss. There are presently no products that provide the capability of extending on-premises to off-premises (cloud) retention lock capability and thereby provide protections required by many corporate compliance and governance standards (e.g., SEC 140 a-f), especially in deduplication environments.

Although certain deduplication systems provide retention lock capabilities for the on-premises files as well as in the cloud tier, they usually include a disclaimer stating that modifying or deleting the cloud volumes directly from the cloud provider's console would allow deleting files before their retention expiry period. This presents a major vulnerability in the retention capability provided by certain applications. Other products may support long term retention of data on the public cloud, but do not support WORM (write once, read many) protection for the cloud archives. Similarly, products like VNX File Level Retention do not support cloud tier appliances, but only for on-premises storage. Thus, there are no existing data protection solutions with cloud tier feature providing true data protection for the locked data in the cloud. All present solutions suffer from the same vulnerability of potential tampering or deletion of locked data by admin users through the cloud provider's console.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 6B1 is the first part of a more detailed flowchart for the process of FIG. 6A, under some embodiments.

FIG. 6B2 is the second part of the more detailed flowchart for the process of FIG. 6A for performing a locking operation for a file in the cloud tier, under some embodiments.

FIG. 8B1 is the first part of a more detailed flowchart for the process of FIG. 8A for performing a lock reversion operation on an RLG locked file in the cloud tier, under some embodiments.

FIG. 8B2 is the second part of the more detailed flowchart for the process of FIG. 8A, under some embodiments.

FIG. 8B3 is the third part of the more detailed flowchart for the process of FIG. 8A, under some embodiments.

DETAILED DESCRIPTION

Figure 1:
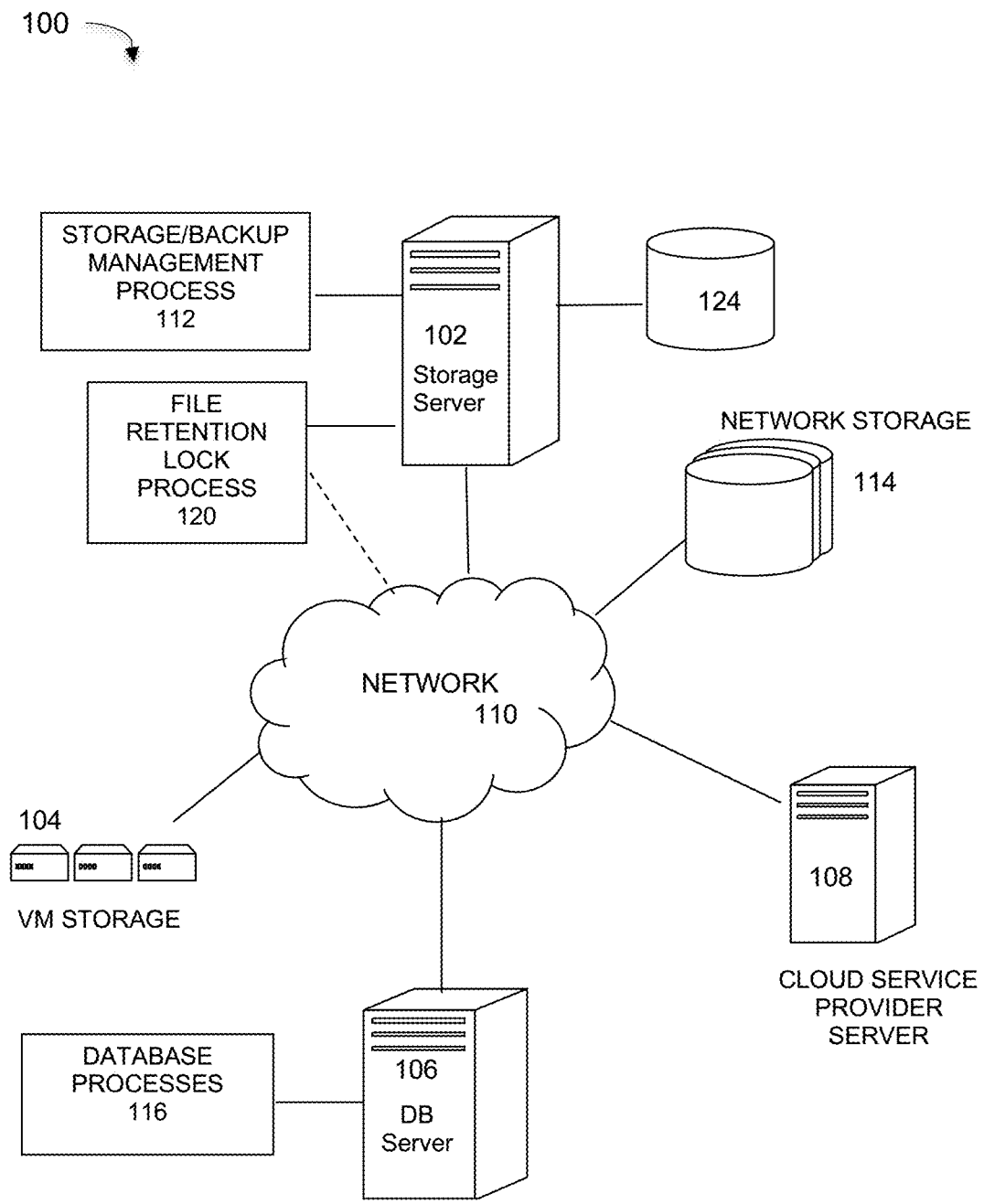
FIG. 1 is a diagram of a cloud computing network implementing retention lock protection for cloud-based storage, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method to efficiently extend retention lock protection from on-premises storage to cloud-based storage with minimal total cost of ownership (TCO). FIG. 1 illustrates a computer network system that implements one or more embodiments of a cloud storage network system implementing a retention lock protection for cloud-based storage, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 maybe a database server executing one or more database processes 116, or it may be any other sources data for use by the resources of system 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP). In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud service provider server 108 may be maintained by any company such as Amazon, EMC, and so on. Depending on implementation, each cloud provider may show up as a cloud tier inside the file system for the user, such as the Data Domain file system. The cloud tier will have one or more cloud units that are used for data migration and storage using migration, copying, duplication, long-term retention (LTR), archiving, and other processes.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1, system 100 includes file retention lock process 120 that may be executed by the storage server 102 as part of backup management process 112, or it may be executed by a cloud or network 110 resource. Process 120 is configured to extend effective file retention lock mechanisms to data in cloud storage with minimal overall cost. Embodiments of process 120 essentially facilitate the secure locking of data when backed up for archive or long-term storage purposes to cloud storage, which may be embodied as storage media within the cloud 110 or other networked storage 114 or VM storage 104. For purposes of this description, 'cloud tier' or 'cloud storage' refers to network or cloud implemented storage media that is used to store data for archival or long-term storage purposes and that imposes a cost in terms of provider fees and/or resource overhead to access; while on-premises or active tier storage refers to storage resident or local to a data source, such as storage 124 or 114.

The data sourced in system 100 may be unstructured data, such as application files (documents), e-mails, and so on. After long periods of time, such data is typically not accessed often, yet must be retained due to certain required retention policies. As such data can often include sensitive business or personal information, it must also be protected against unwanted access and disclosure, as well as protected against deletion or modification.

Unlike backup data, which is a secondary copy of data for recovery purposes, archive data is a primary copy of the data retained for long-term purposes. As data ages and is seldom accessed, this data is typically moved to cheaper archive storage, where it can still be accessed, but no longer occupies valuable on-premises storage space. Such archive data is usually retrievable as individual files, email messages, or other data objects. Since archive data is the primary copy of a data file, administrators must ensure that the integrity of the data meets at least one of the two broad categories of retention standards: (1) corporate governance rules and (2) regulatory compliance (e.g. SEC 17a-4(f), CFTC, etc.) standards.

In general, the file retention lock process includes software that allows a user to set the lock on a file to prevent deletion or modification of a file for a set number of years, such as up to 70 years. The lock is set until the expiration period (expiry) during which, no one is able to modify or delete the file, but after the expiration period has lapsed, the file can be freely modified/deleted. Under present systems, files moved to cloud storage for LTR or archiving cannot easily be protected by such retention lock software, and are thus vulnerable to misuse.

Figure 2:
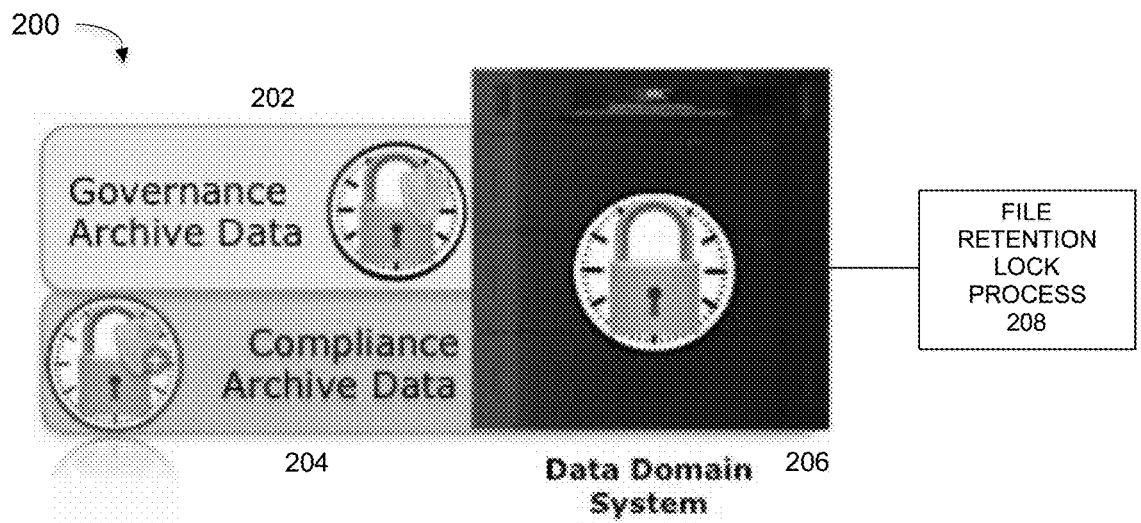
FIG. 2 illustrates the incorporation of the compliance and governance standards in a deduplication backup system, under some embodiments.

FIG. 2 illustrates the incorporation of the compliance and governance standards in a backup system, under some embodiments. For the embodiment of system 200, a retention lock process is used that can support both governance retention rules to governance archive data 202 and compliance retention rules to compliance archive data 204 in a backup system 206, such as a Data Domain backup system. This allows users to consolidate both governance and compliance archive data on a single storage system.

For governance archive data 202, the corporate governance standards for secure archive data retention are generally considered to be the more lenient standards. They allow for flexible control of retention policies but not at the expense of maintaining the integrity of the data during the retention period. These standards apply to environments where the system administrator is trusted with his administrative actions. The storage system 206 must securely retain archive data per corporate governance standards and needs to meet the following set of requirements: (1) allow archive files to be committed for a specific period of time during which the contents of the secured file cannot be deleted or modified; (2) allow for deletion of the retained data once the retention period expires; (3) allow for ease of integration with existing archiving application infrastructure through industry standard protocols such as CIFS and NFS; (3) provide flexible policies such as allow extending the retention period of a secured file, revert of locked state of the archived file, etc.; and (4) provide the ability to replicate both the retained archive files and retention period attribute to a destination site to meet the DR needs for archive data.

For compliance archive data 204, the system imposes records retention requirements stipulated by the Securities & Exchange Commission ("SEC") Rule 17a-4(f) that defines compliance standards for archive storage of records retained on electronic storage media, subject to meeting certain conditions. Specifically, the conditions and requirements that an archive storage system must meet to be SEC compliant are: (1) preserve the records exclusively in a non-rewritable, non-erasable format; (2) verify automatically the quality and accuracy of the storage media recording process; (3) serialize the original and duplicate units of storage media, and the time-date for the required retention period; (4) store separately from the original a duplicate copy of the record stored on an acceptable medium.

It should be noted that the archive system of FIG. 2 is provided for purposes of illustration, and cloud-based retention lock process 208 can be used with any appropriate deduplicated backup system (other than Data Domain), and other or alternative retention policies, rules, and standards.

Figure 3:
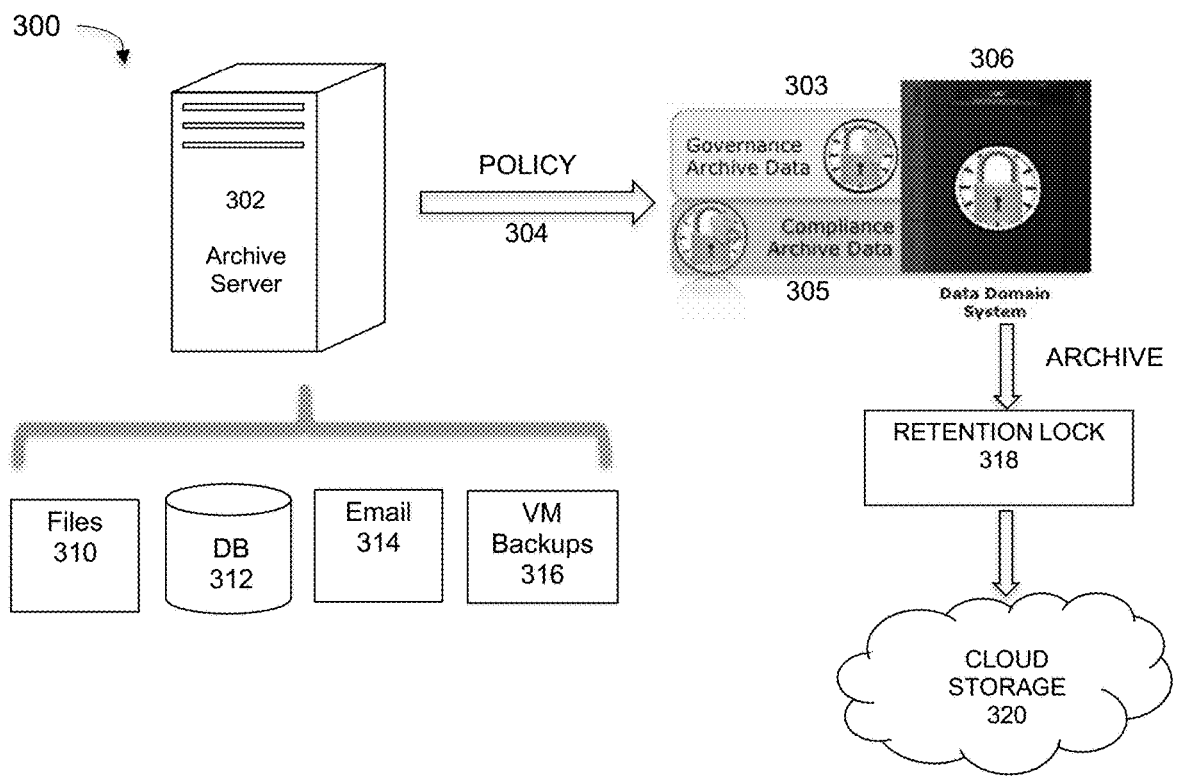
FIG. 3 illustrates a cloud-based deduplication backup system implementing retention lock protection for cloud-based storage, under some embodiments.

FIG. 3 a system implementing retention lock software to optimally apply different retention policies for cloud storage, under some embodiments. As shown in FIG. 3, system 300 includes an archive server 302 that receives data from various sources, such as files 310, database data 312, email server 314, VM backups 316, and so on, for archiving through a deduplication backup system. The archive server applies one or more policies 304 conforming to standards such as governance rules 303 or compliance rules 304 for archiving or long term retention LTR. The deduplication backup system 306 deduplicates the data according to its processes and sends this data to cloud storage 320.

For an embodiment in which the deduplication system 306 is a Data Domain system, a Data Domain Managed Tree (MTree) is used to facilitate the consolidation and protection of both governance and compliance archive data in a single storage system. MTree(s) are user-defined logical partitions of the Data Domain file system that enable granular management of a Data Domain system. In an embodiment, retention lock software 318 can be enabled at an individual MTree level. In general, once an archive file has been migrated onto a Data Domain system, it is the responsibility of the archiving application to set and communicate the retention period attribute to the Data Domain system. The archiving application sends the retention period attribute over standard industry protocols.

As stated above, with deduplicated backup data, the cloud 320 will store data shared among multiple files. The different files of the shared data may have different retention times, and there may even be the case where some locked files share data with non-locked files. In the case of non-deduplicated data, a file can be split into a series of objects, each of which can be directly locked or unlocked, and this case thus provides a straightforward solution. With deduplication processes, such as provided in DD system 306, the application of retention locked rules to deduplicated data stored in cloud storage is much more challenging, especially when trying to minimize TCO. Furthermore, two different types of locks must be used for the different types of archive data 303 and 305. The retention lock for governance archive data 303 is denoted RLG, and allows a user to revert the lock and reapply a lock for a lesser duration at any time. The retention lock for compliance archive data 305 is denoted RLC, and only allows the user to extend the lock, the lock cannot be reduced or removed.

A series of examples is provided to illustrate issues associated with various present solutions for retention locking in cloud storage. The traditional method to solve the issue to create individual cloud objects for each retention lock type and duration, and even maybe for a set of files sharing segments and also having same retention lock duration and mode. This has many drawbacks like multi-fold increase in number of cloud objects, additional overhead to manage the huge set of extra objects, increased bookkeeping for the object metadata, and so on. All this increases the cost factor and can negatively impact the deduplication factor and thus the TCO. For illustration, consider files (file 1 and file 2) made up of the following objects:

File1→object1, object2
File2→object3, object4

In this traditional method, locking file 1 locks object1 and object2. If the files are deduplicated, suppose:

File1→object1, object2
File2→object3, object1

Locking file1 locks object1, object2, and locking file2 locks object3, object1. A first problem is as follows: deleting file2 removes locks on object3, object1, exposing file1, as it shares object1. A second problem is as follows: suppose, File1 has lock duration for 2 years, File2 has lock duration for 1 year. Then, unlocking file2 will unlock object1 and object3, thereby exposing File1.

A third problem is the mixing of deduplicated data shared by RLG and RLC locked files. Here the impact is TCO based, as the RLC lock cannot be reverted. If an object shares data between RLG and RLC then its lock cannot be removed or reduced. This TCO impact is higher, based on amount of RLG data mixed with RLC objects. For example, where an object contains say 1% RLC data and 99% RLG data, even if RLG lock is reverted the object will remain until the RLC duration expires (which could be years) and the customer has to pay for the full object even though only 1% is really necessary. A fourth problem is when while locally, storage is maintained by filesystems like DDFS and the locked data is mixed between RLC & RLG. In cloud storage systems, objects cannot be locked in multiple modes. Additional problems are encountered when large numbers of files share objects, and costs are directly proportional to the deduplication factor. Many other problems can also be identified with present methods of applying retention locks to data store in the cloud.

Embodiments of the retention lock process 318 extend the ability of any deduplication system 306 to extend retention lock capabilities from on-premises storage to the cloud 320 and thus cost-efficiently protect the data while applying one or more retention lock policies 304.

Although embodiments are illustrated and described with respect to a Data Domain system, which is a purpose-built backup appliance providing streaming deduplication, it should be noted that embodiments are not so limited and any other deduplication backup system may be used. Similarly, the cloud tier 320 may integrates with an ECS (or similar) system embodied as a public cloud or hosted private cloud to provide a scalable storage architecture. The archive network 300 may thus be implemented as an ECS-based object storage platform designed around use cases of an ever expanding cloud enabled data center. Object containers that can be created as an endless pool and scaled out across an expandable pool of storage nodes, and data may be stored as objects and accessed through API calls across multiple protocols including S3, Swift, and NFS among others. Embodiments are not so limited however, and other similar cloud-based storage systems may be used.

As described above, no present deduplication file system supports usage of object level retention in co-ordination or in sync with the on-premises filesystem that is managing the objects. In other words, they do not protect against bad actors from deleting on-premises protected files. Embodiment of process 318 provide true and complete protection to retention locked data, both locally as well as in the cloud.

Retention Locking for Cloud-Based Storage

The Data Domain system uses a data movement policy that utilizes a cloud unit connector to a cloud provider (e.g., ECS and others). This produces a file system which is represented as an active tier and a cloud tier with a policy engine that moves backup data to the cloud when it reaches a minimum data age. Metadata is stored on a local active tier, and a mirror copy is also maintained in the cloud tier to facilitate ease of file lookup and recall. In an embodiment, new metadata elements are defined to facilitate retention locking of deduplicated files implementing RLG and RLC rules in the cloud.

Figure 4:
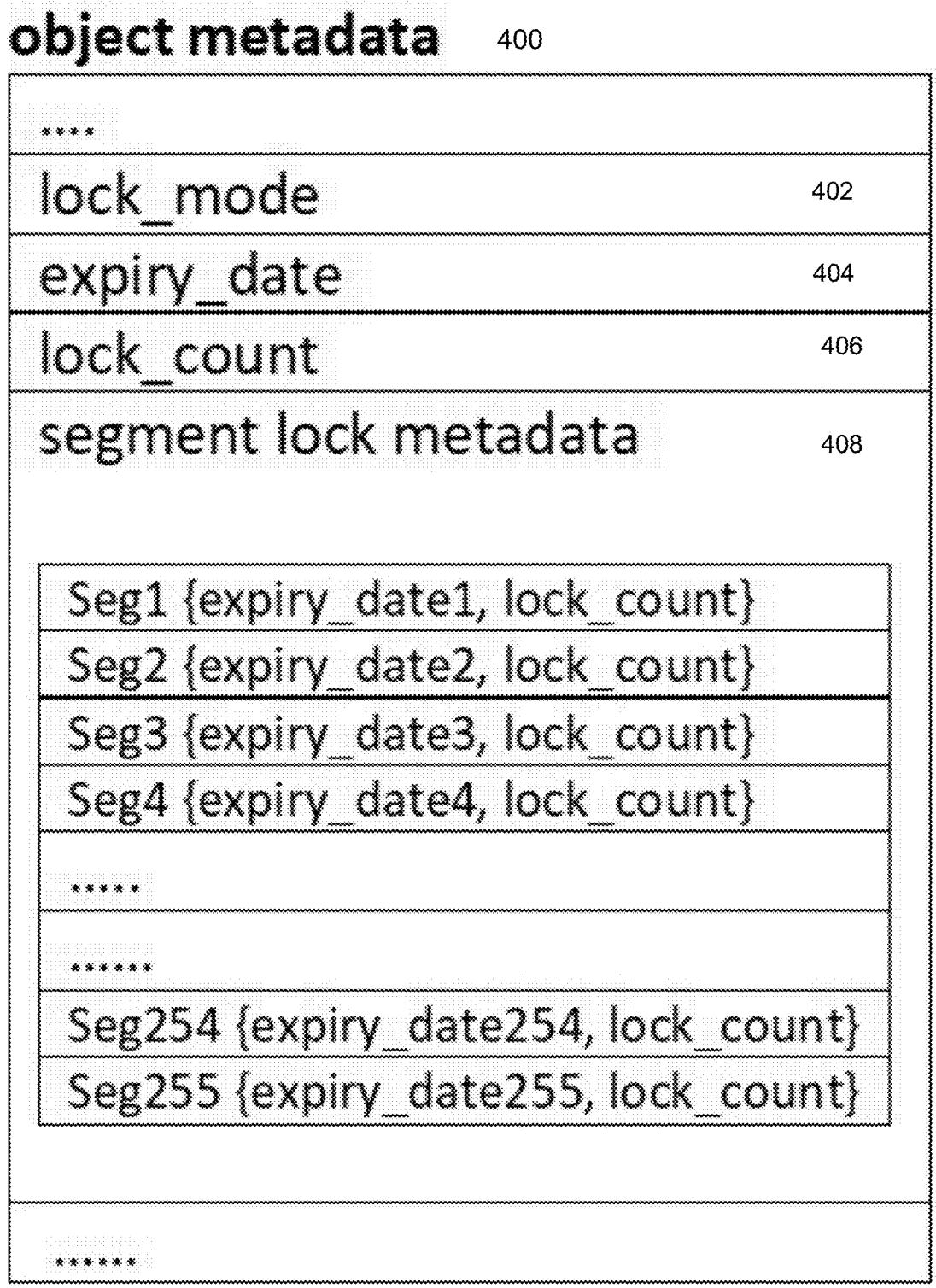
FIG. 4 illustrates retention locking information stored in object and segment metadata, under some embodiments.

FIG. 4 illustrates retention locking information stored in object and segment metadata, under some embodiments. As shown in FIG. 4, object metadata 400 includes a segment lock metadata section 408 that defines the expiry data and lock count for each segment of the data object. For the example of FIG. 4, 256 segments (1-255) can be defined for an object, but other sizes are also possible. The segment expiry date is the maximum expiry date among all the locked files sharing the segment:

segment_expiry_date=MAX(expiry_date among all locked files).

The segment lock count is the number of locked files sharing the segment:

segment_lock_count=No. of locked files sharing the segment.

As shown in FIG. 4, the object metadata 400 is expanded to include new metadata fields 402, 404, and 406. The lock mode metadata element 402 identifies the retention rule as either governance (RLG) or compliance (RLC). The object expiry date (expiry_date) metadata element 404 is the maximum expiry date among all the segments (1-255). The object lock count (lock_count) metadata element 406 is the sum of the lock counts of all the segments (1-255). This new object metadata definition 400 is used in the retention lock process for cloud storage, under some embodiments, as described below.

For purposes of the present description, the term 'file' means any document or data produced by an application program and can comprise structured or unstructured data. A file is comprised of a number of 'objects.' An object can be on the order of several Megabytes (e.g., 4.5 MB) and is essentially a container containing a number segments (e.g., 100 to 200 KB each), which are unique elements of data. Each segment is referenced by more than one file for shared objects, and the objects are to be locked using the retention lock software. Graphically this can be represented as:

FILE→OBJECTS→SEGMENTS

The cloud provider only recognizes the objects, and not the segments themselves. Locking an object locks all segments in the object. Locking an object does not always lock a file per se, as a file is made up of multiple objects. Only after all objects that are part of the file are locked then the file is considered locked.

Figure 5A:
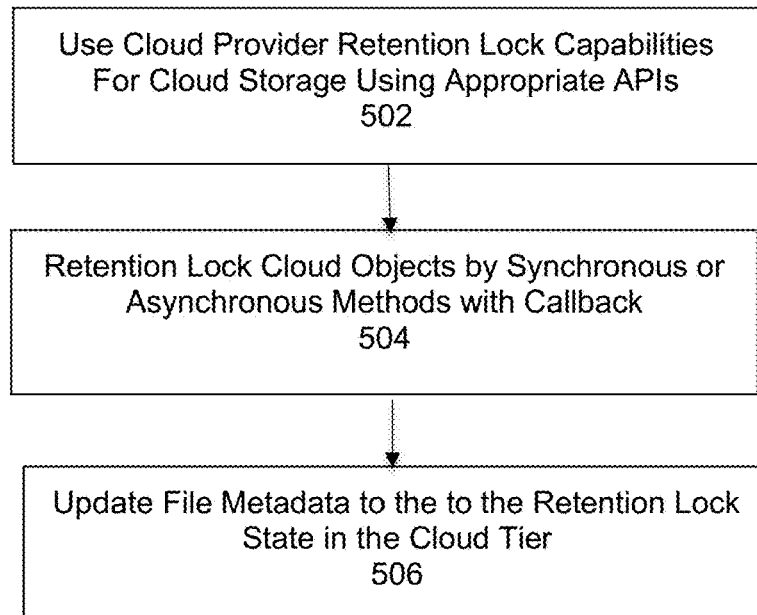
FIG. 5A is a flowchart that illustrates a method to retention lock a file in the cloud, under some embodiments.

FIG. 5A is a flowchart that illustrating an overall method to retention lock a file and its objects in cloud storage, under some embodiments. The basic process of FIG. 5A first identifies files to lock and then actually locks the objects that are part of the file and shows a process of locking the objects and then updating the file metadata. As shown in FIG. 5A, the retention lock process 318 first uses the cloud provider's retention lock capabilities efficiently to extend retention lock protection to the cloud tier objects, each of which would be serving numerous different files, 502. The cloud provider's retention lock capabilities are utilized through appropriate API calls to invoke the provider's respective RLG and RLC processes. This provides an efficient way of handling the retention polices on cloud objects which contain segments serving numerous files locked for different durations and modes. The cloud objects will be retention locked by synchronous or asynchronous methods (based on cloud availability, performance aspects etc.) with a callback function, 504. Upon successful completion of the retention lock of a file, the file's metadata will be updated to reflect the retention lock state of the file in the cloud tier. The overall process must determine what objects to lock, under which mode, and for how long.

Figure 5B:
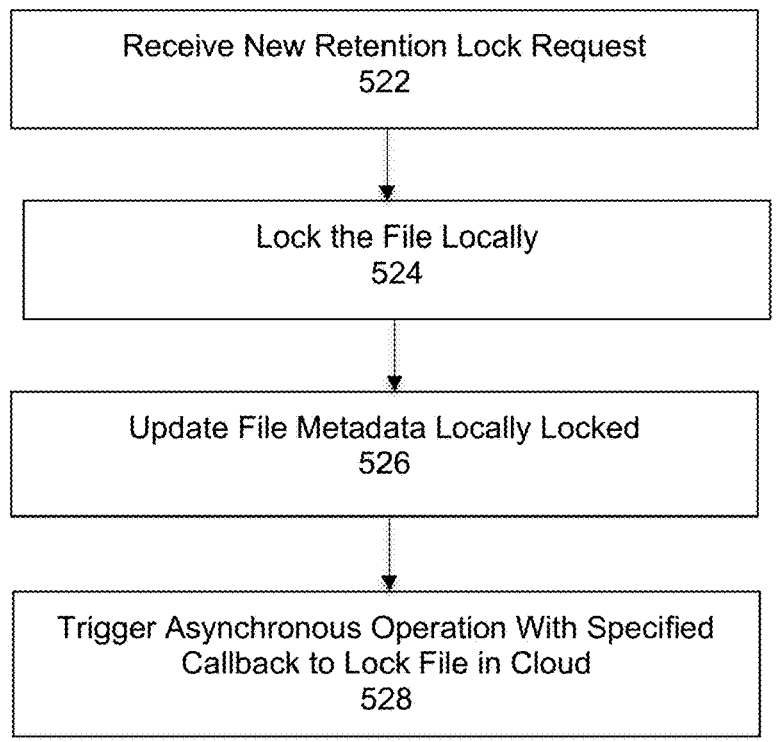
FIG. 5B is a flowchart illustrating a method of processing a new retention lock request, under some embodiments.

Under embodiments, processing a new lock request does not require downloading the object, unpacking it, updating it and then uploading it back to the cloud. Instead, this is done very efficiently on local metadata and synced to cloud along with other metadata as described above, without involving object reads and incurring additional costs. FIG. 5B is a flowchart illustrating a method of processing a new retention lock request, under some embodiments. The method of FIG. 5B begins by receiving a new retention lock request, 522. The file is then locked locally, 524. The metadata for the file is then updated, 526. The process then triggers an asynchronous operation with a specified callback to lock the file in the cloud, 528.

A synchronous operation means that when a user locks a file that has segments in cloud, control returns to the user only after all objects are locked. In case the cloud is not reachable, a failure is returned to the user. An asynchronous operation means when user issues a file lock, control returns as success to user and in the background the process will do the locking. If the cloud is not reachable, the operation will keep trying. The status of the file reflects whether file is locked locally and in the cloud, or only locked locally and not in the cloud, and so on. Thus, locking can be performed as a synchronous process (without callback), where the control returns to the user only after locking all the related objects of the file in the cloud, and an asynchronous process will simply trigger the locking process return control to the user. The locking will be done in background and when all related objects are locked, a callback will update the file metadata indicating that the file is locked in the cloud as well.

Figure 6A:
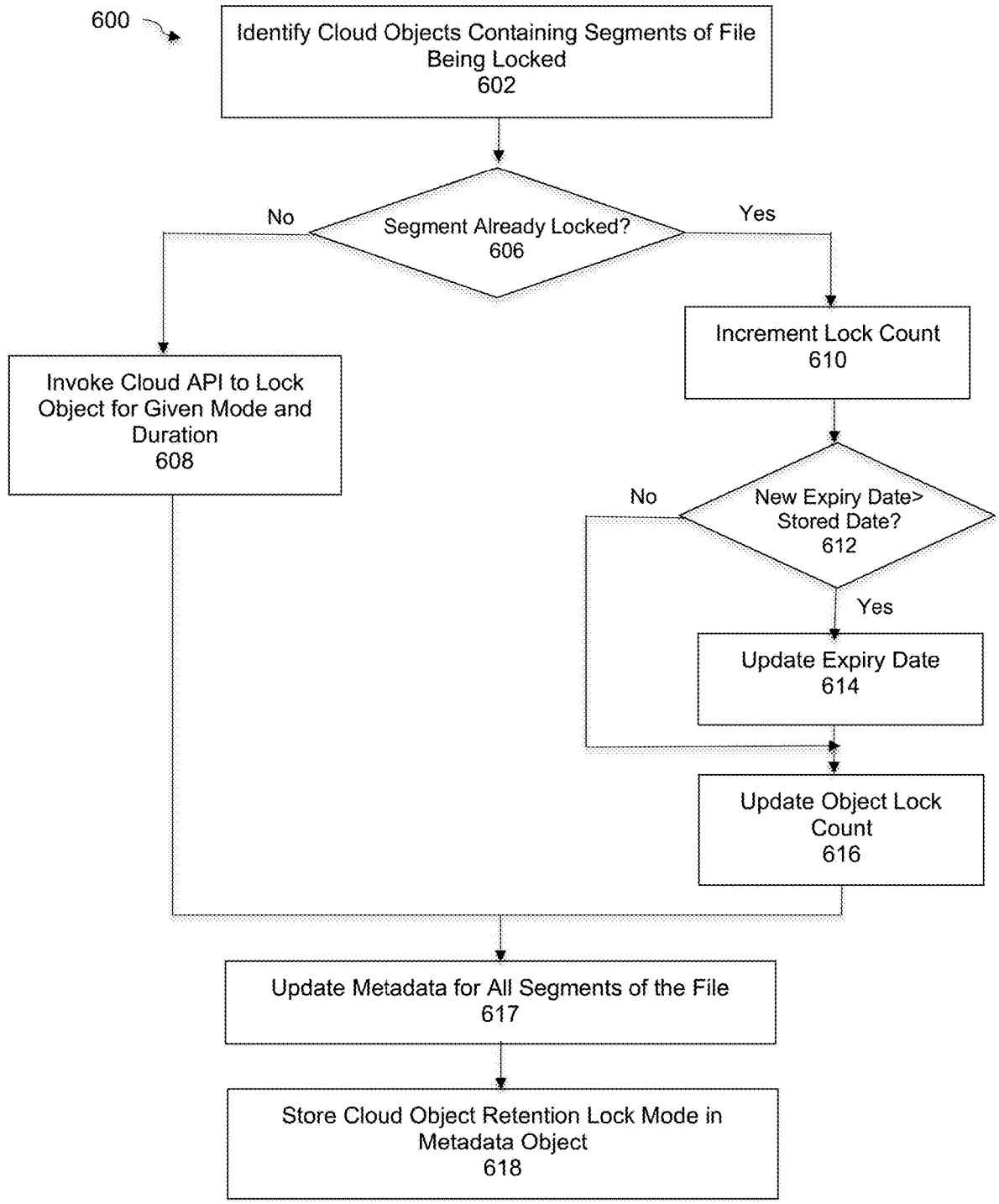
FIG. 6A is a flowchart that illustrates a method applying a retention lock to a file for storage in the cloud, under some embodiments.

FIG. 6A is a flowchart that illustrates a method applying a retention lock to a file for storage in the cloud, under some embodiments. The basic process is that the object lock is checked first, and then if needed, the cloud API is called either to lock the object or extend the lock on the object. In this case, the segment metadata is updated. The lock count and expiry date of the object metadata is will be updated with the same conditions as the segment.

Process 600 starts by identifying all cloud objects that contains segments of the file being locked, 602. In step 606 it is determined whether any of the segments are already marked as locked. Objects will contain segments. First, segment level metadata will get updated (lock count, expiry date), then object level metadata will get updated (lock count, expiry date). If the object was not locked earlier, then a cloud API to lock it will be issued. If the object was already locked and the expiry date was updated, then the cloud API will be called to extend the retention duration on the object. If the object was already locked and the expiry date did not get updated when a lock request comes for a duration lesser than the date for which object is already locked, then no cloud API needs to be invoked. Only metadata gets updated at the segment and object level. If a segment is not marked as locked, then its lock_count is incremented and its expiry date is set to the new expiry date.

If any segment is already marked as locked (in step 606), the process increments the lock_count 610, and next determines whether the new expiry date is greater than the stored expiry date for the locked segment. If so, the expiry date for this segment is updated to the new expiry date, 614. If the object is already locked (in same mode), and if the new expiry date is greater than the expiry_already_set, then object expiration date is updated with the new expiry date. The process then updates the object lock_count by the same amount as the number of segments in the local metadata stored on the machine, 616.

For each object that belong to the file, the process updates the metadata (lock_count, retention time) for all segments of the file, 617. The cloud object's metadata will store the retention lock mode as well, 618. If the object was not locked earlier, then the process invokes the cloud API to lock the object for the given retention mode and duration. If the object was already locked and the expiry date is updated above, then the process invokes the cloud API to extend the lock duration as per the new expiry date.

FIGS. 6B1 and 6B2 are two parts of a more detailed flowchart for the process of FIG. 6A for performing a locking operation for a file in the cloud tier, under some embodiments. FIG. 6B1 illustrates an asynchronous operation to lock a file in the cloud, 620. This process starts by getting the list of all cloud objects with segments serving the file, 622. The process iterates through each object to lock them individually with the required retention lock mode (RLG/RLC) and retention period, 624. Each object is then processed for locking, 626, by first determining whether the object is already locked, 628. If so, it is determined whether or not it is locked in the same retention lock mode, 630. If so, the process determines if the lock is for a different duration and whether the requested lock period is greater than the object's current lock period, 640. If so, the lock period of the object is extended using the cloud provider's API. The process then updates the lock count for each segment in the object, and updates the expiry date for each segment if the requested expiry date is more than the current expiry date of the segment, 652. This step is also performed directly if it is determined that the object is not already locked, 628. Also, the lock count and expiry dates of the object metadata get updated.

If the object is already locked, but in a different lock mode as determined in step 630, the process makes a copy of the object, 646. It then locks the new object with the required mode and duration using the cloud provider's API, 650, and then updates the lock count and expiry date as in step 652.

If the process determines that the lock is the same mode, 630, but that the requested lock period is not greater than the object's current lock period, 640, the process determines that the object is already protected for the same duration or more, 648, and proceeds to update the lock count and expiry date as in step 652. The process then updates the object metadata lock mode and lock count, and also updates the expiry date for the object if the requested expiry date is more than the current expiry date of the object, 653.

After the segment and object updates per steps 652 and 653, the process 620 proceeds to determination step 654 of FIG. 6B2 where it is determined whether or not the object is the last object. If it is not, the process loops back to 626 for the processing of the next object. If the presently processed object is the last object, the process calls an asynchronous callback process to notify that the locking operation is complete, 656. If the locking operation was fully successful, 658, the file's local metadata is updated (remote fully locked), 664, and the process 620 ends. If the operation was not fully successful, 658, nor even partially successful, the process 620 ends with no update of the file's metadata. If, however, the operation is at least partially successful, 660, the process updates the file's local metadata (remote partially locked), 662, and then ends.

Embodiments also include processes to handle revert, delete, and recall operations on locked files in the cloud. Operations such as reverting the retention lock (for RLG locked files), file deletion post expiry, or recall of locked files from cloud all involve reducing the lock counts and updating the expiry dates as needed for the segments and the objects. For example, a file can only be deleted if its lock has been already reverted earlier (in RLG) or its retention lock period has expired (RLG/RLC).

As shown in FIG. 3, system 300 handles two different retention modes, RLG 303 and RLC 305, and this mode is specified by the lock_mode entry 402 in the object metadata 400. Retention lock process 318 includes a sub-process to handle both of these modes. As shown in FIG. 6A, process 600 determines whether a segment is already locked (606). If the cloud object is already locked, but in a different retention lock mode (e.g., RLG instead of RLC), then based on various parameters like lock time of RLC and the amount of data shared between RLG and RLC, a decision can be taken to copy the object to a new object locked using the cloud provider's API, with the required retention lock mode and duration, followed by the similar metadata updates for the segments and the object. This copy sub-process can be configured to always copy, or copy only when determined based on various heuristics. In general, a single object cannot be locked in multiple modes and in RLC mode, the object lock cannot be reverted even if the administrator so desires. The copying process is thus used to create separate objects for different modes for higher granularity, protection and flexibility.

With respect to determining the amount of data shared between RLG and RLC, for example, if an object expiry is within a certain period (e.g., a month), the cost to copy to another object is higher, so it will be allowed to remain there. In case the RLG data is much less and is expiring earlier than RLC data and time, then it is better to copy it out. The decision to copy versus leaving it is done based on cost to keep as is compared to copying into a new object. The cost is determined by amount of data shared in each mode and time they have to be retained.

Figure 7:
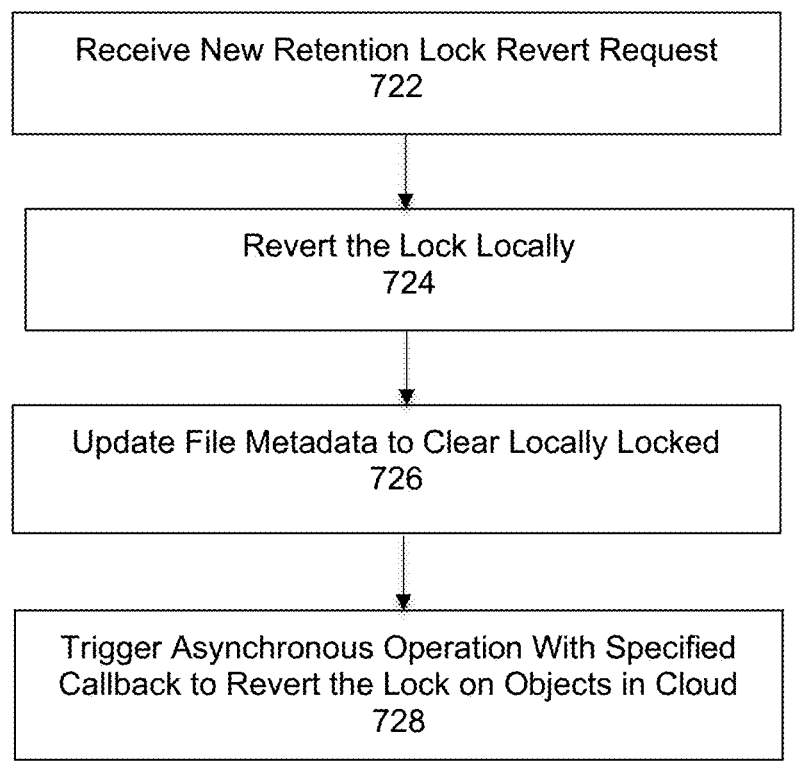
FIG. 7 is a flowchart illustrating a method of processing a new retention lock revert request, under some embodiments.

FIG. 7 is a flowchart illustrating a method of processing a new retention lock revert request, under some embodiments. The method of FIG. 7 begins by receiving a new retention lock revert request, 722. The lock is then reverted locally, 724. The metadata for the file is then updated to clear the locally locked, 726. The process then triggers an asynchronous operation with a specified callback to revert the lock on objects in the cloud, 728.

Figure 8A:
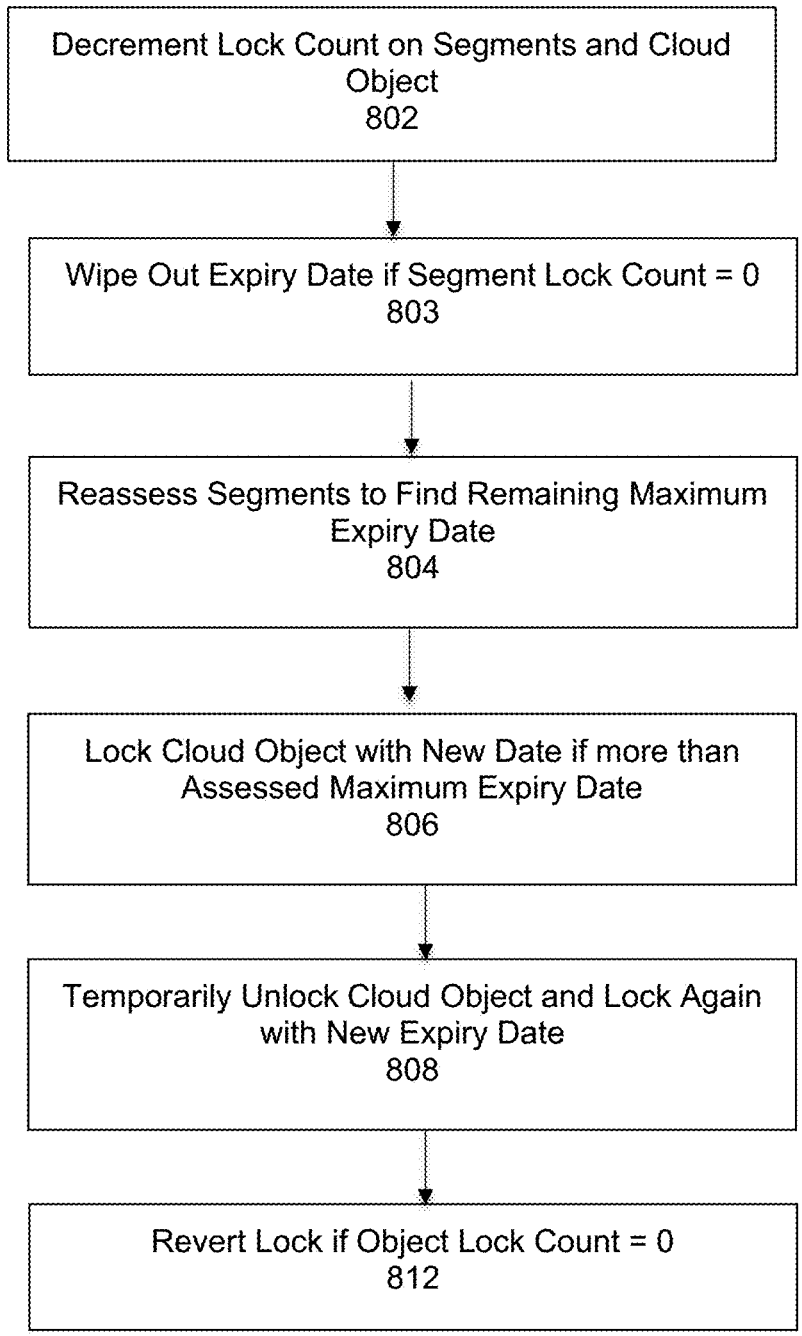
FIG. 8A is a flowchart that illustrates a method of deleting a locked file using lock reversion, under some embodiments.

FIG. 8A is a flowchart that illustrates a method of deleting a locked file using lock reversion, under some embodiments. The process of FIG. 8A starts by decrementing the lock_count on the segments and the cloud object itself (one for each related segment), 802. If the lock_count for a segment goes to 0, then the expiry date for the segment will be wiped out, 803. The segments are then re-assessed to find the remaining max expiry date of the remaining segments, 804. The cloud object will then be locked with the new date, if it is more than the assessed max expiry date, 806. This is done by temporarily unlocking the cloud object and locking it again immediately with the new expiry date (as lock duration reduction is not allowed by cloud providers), 808. If the lock_count on the object goes to 0, meaning that no locked files are sharing any segments from this object, then its lock will be reverted using the cloud provider's API, 812.

FIGS. 8B1, 8B2, and 8B3 are three parts of a more detailed flowchart for the process of FIG. 6A for performing a locking reversion operation on an RLG locked file in the cloud tier, under some embodiments. FIG. 8B1 illustrates an asynchronous operation to revert an RLG lock in the cloud, 820. This process starts by getting the list of all cloud objects with segments serving the file, 822. The process iterates through each object and each concerned segment to update its locked metadata, 824. Each object and concerned segment is then processed, 826, and the lock count for the segment is decremented, 828.

It is determined whether or not the segment lock count is equal to zero, 830. If so, the process wipes out the expiry date for the segment, 832. If the segment lock count is not equal to 0, or after the expiry date is wiped out, the process decrements the lock count for the object, 834. With all segments process, the process then checks the objects, 836. The process then continues with step 838 of FIG. 8B2 in which it is determined whether or not the object lock count is equal to 0. If so, the retention lock governance on the object is reverted using the cloud provider's API, 840. The expiry date from the object metadata is then wiped out, 842.

If, in step 838, it is determined that the object lock count is not equal to zero, the process finds the max expiry date from all the segments in the object, 844. It then determines if the max expiry date is less than the expiry date of the object, 846. If so, the retention lock governance on the object is reverted using the cloud provider's API, 848. The object is locked again for the duration of the max expiry date using the cloud provider's API, 850, and the expiry date is updated in the object metadata, 852. The process then proceeds to after this step, or if, in step 846, the max expiry date is not less than the expiry date of the object, to determination step 854 of FIG. 8B3. In step 854, the process determines whether the present object is the last object. If it is not, the process loops back to 826 for the processing of the next object. If the presently processed object is the last object, the process calls an asynchronous callback process to notify that the lock revert operation is complete, 856. If the lock revert operation was fully successful, 858, the file's local metadata is updated to clear the remote fully locked, 864, and the process 820 ends. If the operation was not fully successful, 858, nor even partially successful, 860, the process 820 ends with no update of the file's metadata. If, however, the operation is at least partially successful, 860, the process updates the file's local metadata to clear remote fully locked and set remote partially locked), 862, and then ends.

An important procedure in deduplicated backup systems is garbage collection (GC), which is a regularly scheduled job that reclaims disk space by removing unnecessary data chunks that are no longer being referenced by files that have been recently modified or deleted. In an embodiment, garbage collectors for the deduplication system are enhanced to use the lock metadata information to select objects which can be cleaned up. The garbage collection process looks at the metadata object 400 to find objects with a 0 lock count in field 406. These objects can then be deleted as part of the unnecessary data clean up.

Embodiments of the retention lock mechanism for cloud storage thus protects cloud objects, even when they are shared by numerous files in the deduplication system. Moreover, the objects are protected even if they have different retention durations and retention modes, all without creating numerous separate object files to cater to the distribution thus preserving the deduplication factor to a large extent while not impacting TCO.

In deduplication backup systems, the data and metadata of objects are stored separately. The lock updates are stored in the metadata (e.g., fields 402, 404, 406 of 400) which is stored locally and updated infrequently to the cloud mainly to maintain the consistency point of the system. The process thus does not generate any significant I/O cycles to the cloud beyond what already exists without this metadata. The size of the additional metadata for the cloud objects is kept very minimal. For deduplication systems, the segment sizes may vary (e.g., 4K, 8K, 12K, 16K etc.) and these segments can be packed into container objects of sizes (e.g., 1 MB, 2 MB, 4 MB etc.). So, the maximum amount of metadata for each object will always remain within a maximum limit depending on the number of segments packed in it, even if these segments are shared by numerous files with different retention periods.

Although embodiments are described with respect to Data Domain deduplication backup processes, embodiments are not so limited and any deduplicated system and backup process may be used.

System Implementation

Embodiments of the processes and techniques described above can be implemented on any appropriate backup system operating environment or file system, or network server system. Such embodiments may include other or alternative data structures or definitions as needed or appropriate.

Figure 9:
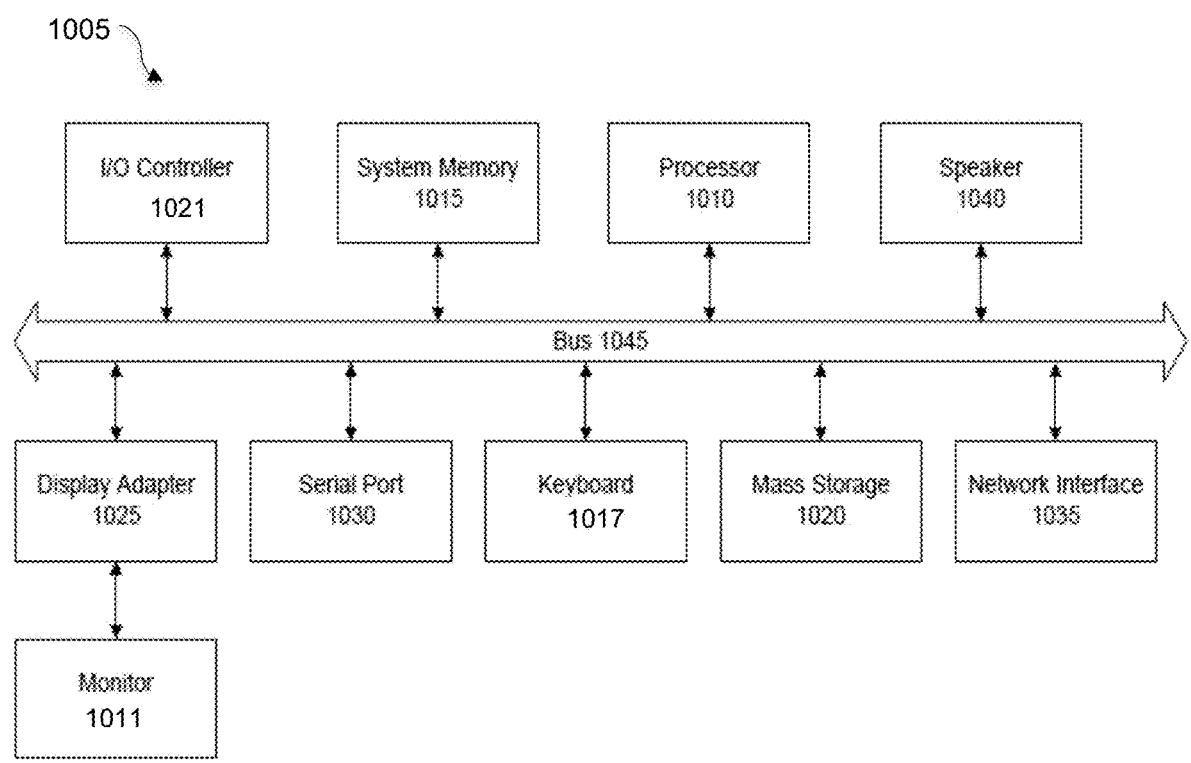
FIG. 9 is a system block diagram of a computer system used to execute one or more software components of the retention lock protection for cloud-based storage, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method to retention lock a file stored in cloud storage by a deduplication backup system, comprising:
    defining object metadata for each object of the file, and comprising a lock count and a retention time based on an expiry date of the retention lock, wherein each object comprises a plurality of segments, the object metadata further comprising a respective expiry date and lock count for each segment of the object, wherein the expiry date metadata comprises a maximum expiry date among all the segments;
    identifying all objects that contain segments of the file being locked;
    updating, for each object, the lock count and retention time in the metadata object for all segments of the file being locked, wherein the lock count metadata comprises a sum of the lock counts of all the segments;
    determining if an object is already locked,
    if the object is not already locked, locking the object using a retention lock defining a certain retention time and updating the object metadata with a new lock count and the retention time;
    if the object is already locked, incrementing the lock count and updating the retention time for the expiry date if expiry date of a previous lock is older than a current expiry date;
    selecting, through a retention lock mode, one of retention lock governance (RLG) and retention lock compliance (RLC); and
    reverting the RLG by decrementing the lock count of the object and on each segment of the object, reassessing the segments of the object to find a remaining maximum expiration date, and locking the object again for a duration of the maximum expiry date, if the remaining maximum expiry date is not less than the remaining maximum expiration date.

2. The method of claim 1 wherein the object is locked using a retention lock software process provided by a cloud provider supporting the cloud storage through an application programming interface (API).

3. The method of claim 1 wherein the deduplication backup system produces deduplicated segments within the object with different respective retention times.

4. The method of claim 1 wherein the locking step is performed by one of a synchronous process and an asynchronous process with a callback function.

5. The method of claim 1 wherein the RLG retention lock can be reverted, and the RLC retention lock cannot be reverted.

6. The method of claim 5 wherein the locking is performed by temporarily unlocking the object and re-locking it with the remaining maximum expiry date.

7. The method of claim 6 further comprising:
    deleting the expiry date of a segment when the lock count of the segment is decremented to zero; and
    reverting the RLG lock when the lock count of the object is decremented to zero.

8. The method of claim 5 wherein the object metadata for the object further comprises a lock mode indicator, and wherein the step of determining if the object is already locked further comprises determining if the object is already locked in a different lock mode between the RLG and RLC lock modes, and if so, copying the object to a new object locked by the new lock mode.

9. The method of claim 8 the method further comprising: updating the lock mode indicator of the copied object with the new lock mode, and updating the retention time of the copied object with a new retention time for the new lock mode.

10. The method of claim 9 wherein the object is copied to the new object when threshold values are met for a lock time of an original RLC retention lock and an amount of data shared between the RLG and RLC lock modes.

11. The method of claim 9 wherein the object is copied to the new object when certain heuristic measurements between the RLG and RLC lock modes are met.

12. The method of claim 1 wherein the cloud storage comprises storage media resident in a cloud computing network maintained by a cloud service provider, and provided for long term retention of data processed using the metadata, and further wherein the deduplication backup system is executed by a data storage server running a Data Domain file system (DDFS).

13. A tangible computer program product having stored thereon program code that when executed by a processor, cause the processor to perform a method of retention locking a file stored in cloud storage by a deduplication backup system comprising:

defining object metadata for each object of the file, and comprising a lock count and a retention time based on an expiry date of the retention lock, wherein each object comprises a plurality of segments, the object metadata further comprising a respective expiry date and lock count for each segment of the object, wherein the expiry date metadata comprises a maximum expiry date among all the segments;

identifying all objects that contain segments of the file being locked;

updating, for each object, the lock count and retention time in the metadata object for all segments of the file being locked, wherein the lock count metadata comprises a sum of the lock counts of all the segments;

determining if an object is already locked, if the object is not already locked, locking the object using a retention lock defining a certain retention time and updating the object metadata with a new lock count and the retention time;

if the object is already locked, incrementing the lock count and updating the retention time for the expiry date if expiry date of a previous lock is older than a current expiry date;

selecting, through a retention lock mode, one of retention lock governance (RLG) and retention lock compliance (RLC); and reverting the RLG by decrementing the lock count of the object and on each segment of the object, reassessing the segments of the object to find a remaining maximum expiration date, and locking the object again for a duration of the maximum expiry date, if the remaining maximum expiry date is not less than the remaining maximum expiration date.

* * * * *